United States Patent [19] [11] 4,028,217
Okada et al. [45] June 7, 1977

[54] METHOD FOR THE SEPARATION OF CHLOROPHYLL

[75] Inventors: Akira Okada; Keiji Iriyama; Masaru Shiraki, all of Yokohama, Japan

[73] Assignee: Director-General of the Agency of Industrial Science and Technology, Tokyo, Japan

[22] Filed: Oct. 10, 1975

[21] Appl. No.: 621,516

[30] Foreign Application Priority Data

Oct. 14, 1974 Japan .............................. 49-117850

[52] U.S. Cl. .............................................. 260/314
[51] Int. Cl.$^2$ ...................................... C07D 487/22
[58] Field of Search .................................... 260/314

[56] References Cited

UNITED STATES PATENTS

| 2,940,981 | 6/1960 | Trurnit et al. | 260/314 |
| 3,274,072 | 9/1966 | Burdick | 260/314 |
| 3,274,073 | 9/1966 | Burdick | 260/314 |

OTHER PUBLICATIONS

Jennison et al., "J. Tenn. Acad. Science", vol. 9, (1934), pp. 274–277.
Iriyama et al., "J. Biochemistry", vol. 76, pp. 901–904, (1974).

*Primary Examiner*—Henry R. Jiles
*Assistant Examiner*—Robert T. Bond
*Attorney, Agent, or Firm*—William J. Daniel

[57] ABSTRACT

To photosynthetizing living organisms such as spinach was added an organic solvent selected from the group consisting of methyl alcohol, acetone, methyl ethyl ketone and butylcarbitol in a weight amount of 3 – 8 times as much as the living organisms and the mixture is thoroughly triturated and then treated by the following route: after removal of insoluble matters, the liquid is admixed with dioxane in a volumetric amount of 1/5–1/8 of the volume of the organic solvent and then with a phosphate buffer solution until the liquid becomes turbid, and thereafter allowed to stand in a cooled dark place, and the precipitated crystalline chlorophyll is separated from the solution.

2 Claims, No Drawings

METHOD FOR THE SEPARATION OF CHLOROPHYLL

BACKGROUND OF THE INVENTION

The present invention relates to a method for the separation of pure chlorophyll crystals from photosynthetizing living organisms. More particularly, the present invention relates to a method for obtaining pure chlorophyll wherein a combination of two organic solvents is used to precipitate chlorophyll crystals.

A conventional method known hitherto for extracting chlorophyll from photosynthetizing living organisms such as spinach comprises treating spinach with boiling water and then extracting the treated spinach with methyl alcohol and petroleum ether. However, this method fails to obtain chlorophyll in a good yield because the method involves chemical decomposition of chlorophyll during the treatment with boiling water and loss of chlorophyll during the extraction operation. In addition, this method has such a drawback that all operations involved are complicate and troublesome and thus need considerable time and labor. As further drawback of this method, chlorophyll obtained according to this method contains yellow impurities which make difficult the operation in the subsequent chromatographic step.

BRIEF SUMMARY OF THE INVENTION

As a result of many researches made for developing a method for separting pure chlorophyll from photosynthetizing living organisms in a simple operation, it has now been found that chlorophyll can easily be separated as percipitate from the living organisms by extracting chlorophyll with an organic solvent from the living orgnaisms, adding dioxane to the liquid extract, adding to the mixture a phosphoric acid buffer solution and thereafter allowing the mixture to stand in a cooled dark place. The present invention has been accomplished on the basis of the above finding.

In accordance with the present invention, there is provided a method for the separation of chlorophyll, characterized by adding to photosynthetizing living organisms an organic solvent selected from methyl alcohol, acetone, methyl ethyl ketone and butylcarbitol in a weight amount of 3 – 8 times as much as the living organisms, triturating the mixture, removing insoluble matters from the liquid, admixing therewith dioxane in a volumetric amount of 1/5 – ⅛ of the volume of the organic solvent, adding to the mixture a phesphate buffer solution until the liquid begins to form turbidity, allowing the mixture to stand in a cooled dark place and thereafter separating the precipitated crystalline chlorophyll.

It is an object of the present invention to provide a method for obtaining pure chlorphyill from photosynthetizing living organisms wherein a combination of organic solvent is used.

It is another object of the present invention to provide a method for obtaining chlorophyll in an efficient and easy manner from photosynthetizing living organisms.

Other and further objects, features and advantages of the invention will apear more fully from the following description.

DETAILED DESCRIPTION OF THE INVENTION

The photosynthetizing living organisms used as the starting material for the present invention involve all of the living organisms containing chlorophyll from the group of photosynthetizing microorganisms, sea weeds to the group of higher green plants. Illustrative of such living organisms are photosynthetizing microorganisms such as *Rhodoseudomonas palustris*, algae such as *Chlorella ellipsoidea* and *Porphyra tenera Kjellm*, and higher green plants such as spinach, sorrel (*Rumex japonicus*), sorrel vine and dyer's grape.

Extraction solvents selected as a result of a research and used in the present invention are organic solvents such as methyl alcohol, acetone, methyl ethyl ketone and butylcarbitol.

According to the present invention, the photosynthetizing living organisms are admixed with the extraction solvent in a weight amount of 3 – 8 times as much as the living organisms and the mixture is thoroughly triturated in a mixer. The time requried for this trituration is usually 1 – 10 minutes although it may be varied more or less according to the sort of the starting material used. The liquid extract thus obtained is then filtered through a proper filter material such as gauze to remove insoluble matters. The filtrate is admixed with dioxane in a volumetric amount of 1/5 – ⅛ of the volume of the extractoin solvent. A phosphate buffer solution having a concentration of 0.001 – 0.01 M and a pH value of 8 is then added dropwise to the liquid mixture. When the buffer solution in an amount equal to that of the dioxane is added, the mixture begins to show turbidity. The addition of the buffer solution is stopped at this stage and the mixture is allowed to stand in a refrigerator for 1 – 3 hours whereupon chlorophyll is precipitated as crystals. A cooling temperature of 0° – 10° C is particularly preferred for this purpose. The reason why chlorophyll is precipitated in a ternary solvent of methyl alcohol/dioxane/water system is probably due to the fact that chlorophyll molecules containing magnesium atom are selectively associated with dioxane molecules and crystallize out.

In the present invention, this crystallization operations may be repeated for several times, if desired, to enhance the purity of chlorophyll crystals.

The crystals thus precipitated are separated from the liquid, for example, by way of centrifugal separation.

If necessary, the product of the present invention may be dissolved in petroleum ether and subjected to a chromatographic treatment using cane sugar whereby the product is further separated into chlorophyll A and chlorophyll B.

The pure chlorophyll obtained according to the present invention is suitable as additive to various drugs, foods and cosmetics.

The product of the present invention can also be used for the manufacture of a built-in film of chlorophyll, which is extremely enhanced in the purity and thus is very useful as an organic semi-conductive substance.

According to the present invention, chlorophyll alone can selectively be separated from carotinoids, xanthophyll, yellow pigments and resins by a very simple treatment and within a very short period of time. Therefore, it is an additional merit of the present invention that pure chlorophyll A and chlrophyll B can be obtained which are free from impurities which disturb chromatographic treatments.

The present invention will be understood more readily with reference to the following examples. However, these examples are intended to illustrate the invention and are not to be construed to limit the scope of the invention.

EXAMPLE 1

To 100 g of spinach leaves were added 500 ml of methyl alcohol. The mixture was triturated for 3 minutes in a warring blender and the resulting green extract was filtered through five sheets of gauze to remove insoluble matters. To the deep green solution thus obtained were added 70 ml of dioxane. A $10^{-3}$ m/mol phosphate buffer solution (ph 8) was then added dropwise to the liquid mixture under agitation until the liquid became turbid. About 80 ml of the buffer solution are required for this treatment. By this treatment, chlorophyll precipitated in the form of flocks. The mixture was then allowed to stand in a refrigerator for one hour and subjected to decantation to separate the supernatant liquid from the precipitate. The remaining suspension was then subjected to centrifugal separation conducted for 5 minutes.

Crude chlorophyll thus obtained was dissolved in a small amount of a mixture of methyl alcohol and dioxane (mixing ratio by volume; 7:1) and the buffer solution was then added to the solution to effect precipitation of chlorophyll. By repeating a similar treatment, 0.191 g of the pure product (chlorophyll A and chlorophyll B) was obtained, which was free from impurities such as neoxanthine, violaxanthin, lutein, zeaxanthin, and carotenoids.

EXAMPLE 2

To 100 g of dried chlorell were added 800 ml of acetone. The mixture was treated in the same manner as described in Example 1 whereby 0.190 g in total of chlorophyll A and chlorophyll B was obtained.

In this example, an almost similar result was obtained by using the equiamount of methyl ethyl ketone or butylcarbitol in place of acetone and treating the starting material in a similar manner.

Having described a specific embodiment of our bearing, it is believed obvious that modification and variation of the present invention is possible in the light of the above teachings.

What is claimed is:

1. A method for the separation of chlorophyll, characterized by adding to a given amount of a photosynthetizing living organism at least one organic solvent selected from the group consisting of methyl alcohol, acetone, methyl ethyl ketone and butylcarbitol in a weight amount of 3-8 times as much as said living organisms, triturating the mixture, removing insoluble matter from the liquid, admixing therewith dioxane in a volumetric amount of 1/5 – ⅛ of the volume of said organic solvent, adding to the liquid mixture an aqueous phosphate buffer solution having a pH of about 8 until said liquid mixture becomes turbid, allowing said mixture to stand in a cooled dark place and thereafter separating the precipitated crystalline chlorophyll.

2. A method according to claim 1 wherein said mixture is allowed to stand in a dark place kept at 0° – 10° C after the addition thereto of said phosphate buffer solution.

* * * * *